(12) United States Patent
Christensen et al.

(10) Patent No.: US 12,527,464 B2
(45) Date of Patent: Jan. 20, 2026

(54) ENDOSCOPE COMPRISING AN ENDOSCOPE HANDLE WITH A SEPARATION MEANS

(71) Applicant: AMBU A/S, Ballerup (DK)

(72) Inventors: Martin Johst Christensen, København Ø (DK); Lasse Markworth Johnsen, Birkerød (DE)

(73) Assignee: AMBU A/S, Ballerup (DK)

( * ) Notice: Subject to any disclaimer, the term of this patent is extended or adjusted under 35 U.S.C. 154(b) by 310 days.

(21) Appl. No.: 18/266,961

(22) PCT Filed: Dec. 8, 2021

(86) PCT No.: PCT/EP2021/084832
§ 371 (c)(1),
(2) Date: Jun. 13, 2023

(87) PCT Pub. No.: WO2022/128690
PCT Pub. Date: Jun. 23, 2022

(65) Prior Publication Data
US 2023/0389782 A1    Dec. 7, 2023

(30) Foreign Application Priority Data

Dec. 17, 2020   (DE) ..................... 10 2020 134 036.2

(51) Int. Cl.
*A61B 1/00*    (2006.01)
*A61B 1/005*   (2006.01)
(Continued)

(52) U.S. Cl.
CPC ........ *A61B 1/0057* (2013.01); *A61B 1/00105* (2013.01); *A61B 1/0052* (2013.01); *A61B 1/015* (2013.01); *A61B 1/05* (2013.01)

(58) Field of Classification Search
CPC . A61B 1/0057; A61B 1/00105; A61B 1/0052; A61B 1/015; A61B 1/00066; A61B 1/05
See application file for complete search history.

(56) References Cited

U.S. PATENT DOCUMENTS 5,373,317 A    12/1994    Salvati et al.
5,879,289 A     3/1999    Yarush et al.
(Continued)

FOREIGN PATENT DOCUMENTS

CN      1925780 A      3/2007
CN    107809940 A      3/2018
(Continued)

OTHER PUBLICATIONS

German Search Report from DE 10 2020 134 036.2, mailed Jul. 23, 2021, 6 pages.
(Continued)

*Primary Examiner* — Anh Tuan T Nguyen
*Assistant Examiner* — Rynae E Boler
(74) *Attorney, Agent, or Firm* — Faegre Drinker Biddle & Reath LLP (57) ABSTRACT

An endoscope including a distal tip unit having an optical system; a handle having a housing, a printed circuit board, and an operating unit for steering the distal tip unit, the housing enclosing the printed circuit board; a bending section; and a steering wire for controlling a bending movement of the bending section, the steering wire being connected to the operating unit. The printed circuit board is configured to process information received from the optical system via cables extending from the distal tip unit. A separation means arranged in the housing and separates an inner space of the housing at least into a printed circuit board
(Continued)

compartment accommodating the printed circuit board and a steering wire compartment accommodating the steering wire.

20 Claims, 2 Drawing Sheets

(51) Int. Cl.
*A61B 1/015* (2006.01)
*A61B 1/05* (2006.01)

(56) References Cited

U.S. PATENT DOCUMENTS

| | | | |
|---|---|---|---|
| 6,554,765 B1 | 4/2003 | Yarush et al. | |
| 7,410,462 B2 | 8/2008 | Navok et al. | |
| 8,152,715 B2 | 4/2012 | Root et al. | |
| 9,237,837 B2 | 1/2016 | Omoto et al. | |
| 9,498,112 B1* | 11/2016 | Stewart | A61B 1/05 |
| 9,907,457 B2 | 3/2018 | Grant et al. | |
| 10,616,491 B2 | 4/2020 | Haggerty et al. | |
| 2015/0282701 A1* | 10/2015 | Oskin | A61B 1/128 600/131 |
| 2016/0367112 A1* | 12/2016 | Koyama | A61B 1/0055 |
| 2017/0065152 A1 | 3/2017 | Koyama | |
| 2018/0296069 A1 | 10/2018 | Matthison-Hansen | |
| 2018/0309908 A1* | 10/2018 | Matthison-Hansen | H04N 23/63 |
| 2019/0059698 A1* | 2/2019 | Ting | A61B 1/0052 |
| 2019/0246877 A1 | 8/2019 | Mitsuya et al. | |
| 2019/0328217 A1 | 10/2019 | Moreau et al. | |
| 2020/0267292 A1 | 8/2020 | Matthison-Hansen et al. | |
| 2021/0113068 A1* | 4/2021 | Shin | A61B 1/0055 |

FOREIGN PATENT DOCUMENTS

| | | |
|---|---|---|
| DE | 102017102178 B3 | 6/2018 |
| JP | 2004-248777 A | 9/2004 |
| JP | 3594271 B2 | 11/2004 |
| JP | 2012-205808 A | 10/2012 |
| TW | I622377 B | 5/2018 |
| WO | 2009/90667 A1 | 7/2009 |
| WO | 2016/188540 A1 | 12/2016 |
| WO | 2017/40692 A1 | 3/2017 |
| WO | 2018/98465 A1 | 5/2018 |
| WO | 2018/162556 A1 | 9/2018 |

OTHER PUBLICATIONS

International Search Report and Written Opinion from International application No. PCT/EP2021/084832, dated Mar. 16, 2022, 10 pages.

First Office Action issued in CN 202180085522.4, dated Jun. 28, 2025, 13 pages (6 pages of English translation and 7 pages of original document), Jun. 28, 2025.

* cited by examiner

ENDOSCOPE COMPRISING AN ENDOSCOPE HANDLE WITH A SEPARATION MEANS

CROSS REFERENCE TO RELATED APPLICATIONS

This application is a National Phase entry under 35 U.S.C. § 371 of International Application No. PCT/EP2021/084832, filed Dec. 8, 2021, which claims the benefit of and priority from German Patent Application No. DE 10 2020 134 036.2, filed Dec. 17, 2020; said applications are incorporated by reference herein in their entirety.

The present disclosure relates to an endoscope comprising a distal tip unit configured to be inserted into a patient's body cavity and comprising an optical system, preferably a camera; a proximal endoscope handle comprising an operating unit for steering the distal tip unit, a housing and a printed circuit board, the housing enclosing the printed circuit board; an insertion tube and a bending section, the insertion tube and the bending section connecting the proximal endoscope handle and the distal tip unit; a steering wire for controlling a bending movement of the bending section, the steering wire being connected to the operating unit and extending through the insertion tube and the bending section; wherein the printed circuit board is configured to process information received from the optical system via cables extending from the distal tip unit through the bending section and the insertion tube to the proximal endoscope handle.

PRIOR ART

Endoscopes and similar specialized instruments such as bronchoscopes, arthroscopes, colonoscopes, laparoscopes, gastroscopes and duodenoscopes are well known from the state of the art and are used for visual examination and diagnosis of hollow organs and body cavities, as well as to assist in surgery, e.g. for a targeted tissue sampling. Basically, a distal tip unit of an endoscope, which is connected to a proximal endoscope handle via a bending section and an insertion tube, can be inserted into a hollow organ or body cavity to be investigated with the endoscope. Both reusable and disposable endoscopes are known from the state of the art.

Known endoscopes usually contain (a) steering/control wire(s) that is/are pulled and released to bend a (flexible) bending section of the endoscope, such as a flexible shaft, in order to tilt the distal tip unit. The rotating force being applied to an operating unit like a handle wheel or a lever provided at the proximal endoscope handle by a user is basically transmitted into a pulling force acting on the steering wire in an axial direction of the steering wire. Thereby, the connection of the steering wire to the operating unit is essential for transmitting the rotating force from the operating unit to the steering wire.

As endoscopes are usually used for visual examination and diagnosis of hollow organs and body cavities, an optical system for imaging, such as a camera unit, and illuminating/lighting means for illuminating the body cavity, for example light-emitting diodes or an end portion of a light fiber bundle, are arranged at the distal tip unit of a conventional endoscope. In order to process information received from the optical system arranged at the distal tip unit, a printed circuit board may be provided within the proximal endoscope handle. Cables extending from the distal tip unit through the bending section and the insertion tube to the proximal endoscope handle are used to transfer the information collected by the camera unit.

There is for example known a prior art endoscope in which an endoscope handle comprises a housing and a printed circuit board attached to an inner side of the housing. The printed circuit board processes information transmitted by cables extending from a camera unit provided in a distal tip unit via a bending section and an insertion tube to the endoscope handle. Steering wires are provided which may be pulled by an operator (e.g. by operating a lever or a wheel) to control a bending of the distal tip unit.

Moreover, a document WO 2016/188540 A1 discloses an endoscope comprising a proximal endoscope handle having a housing formed by two shell parts. A chassis is provided to which almost all parts of the endoscope, inter alia the half shells, are mounted. A so called strike plate is provided in the chassis, which protects a working channel wall from undesired rupture. According to the disclosure of WO 2016/188540 A1 the electronics of the endoscope such as a printed circuit board may be arranged on said strike plate.

In the above mentioned known prior art endoscope and in the endoscope disclosed in WO 2016/188540 A1, during a bending operation of the distal tip unit, the steering wires move around inside the housing and are in addition electrically conductive. There is thus the danger that the printed circuit board is mechanically and electrically damaged/affected by the steering wires. To mitigate this risk, the printed circuit board is typically covered by a protective layer (e.g. tape or glue), which protects the electrical components of the printed circuit board from mechanical and electrical damage by the metal steering wires. However, the encapsulation of the printed circuit board is labor intensive and requires high quality control to ensure that the protective layer adequately protects the printed circuit board. This increases the manufacturing costs of the endoscope.

Another document WO 2018/162556 A1 discloses an endoscope having a proximal endoscope handle, in which an anchoring block is provided for guiding and retaining the steering wires. WO 2018/162556 A1 is however silent with respect to an arrangement of a printed circuit board in the endoscope.

BRIEF DESCRIPTION OF THE DISCLOSURE

The tasks and objectives of the present disclosure are to eliminate or at least to reduce the disadvantages of the prior art. In particular, an endoscope shall be provided, in which a mechanical or electrical damage of a printed circuit board caused by a moving around of steering wires in a housing of an endoscope handle is prevented with a simple, easily implementable and less labor-intensive solution. In particular, an operational safety shall be improved. Besides, an additional encapsulation process of the printed circuit board shall preferably not be obligatory any more.

The tasks and objectives are solved by an endoscope in accordance with claim 1 and by a system in accordance with claim 14. Advantageous embodiments are claimed in the dependent claims and/or are explained below.

In the present disclosure, "distal" basically means "in a direction away from a user/physician towards a patient" and "proximal" basically means "in a direction towards the user/physician away from the patient".

The present disclosure relates to an endoscope comprising: a distal tip unit configured to be inserted into a patient's body cavity and comprising an optical system, preferably a camera; a proximal endoscope handle comprising an operating unit, preferably a handle wheel, for steering the distal tip unit, a housing and a printed circuit board, the housing enclosing the printed circuit board; an insertion tube and a bending section, the insertion tube and the bending section connecting the proximal endoscope handle and the distal tip unit; a steering wire, preferably formed as a steel wire, for controlling a bending movement of the bending section, the steering wire being connected to the operating unit and extending through the insertion tube and the bending section. The printed circuit board is configured to process information received from the optical system via cables extending from the distal tip unit through the bending section and the insertion tube to the proximal endoscope handle. The endoscope further comprises a separation means arranged in the housing and separating an inner space of the housing at least into a printed circuit board compartment accommodating the printed circuit board, and a steering wire compartment accommodating the steering wire.

In other words, according to the present disclosure, when the printed circuit board and the steering wire(s) are arranged in the proximal endoscope handle, they are separated from each other, as they are provided in at least two different, separate compartments formed by the separation means. So it is structurally prevented that a contact between the printed circuit board and the steering wire(s) occurs. Thus, a mechanical and electrical damage of the printed circuit board cannot occur, as there is a barrier, which prevents that the steering wire(s) reach(es) the printed circuit board. An additional encapsulation process of the printed circuit board, which is labor intensive and requires high quality control, is therefore not obligatory any more. This also leads to a reduction of the manufacturing costs.

It is to be understood that the present disclosure is not limited to the printed circuit board not being encapsulated. I.e. the printed circuit board may nevertheless be encapsulated, although it is appropriately protected by the printed circuit board compartment. E.g. it applies for some endoscopes (in particular when a lot of water is used) that the printed circuit board has to be encapsulated in order to obtain a required electrical safety certification.

Preferably the separation means separates the printed circuit board not only from the steering wire(s) but also from other components like tubes arranged in and extending through the endoscope handle. So it is also prevented that the printed circuit board is damaged by such other components. In addition, the cables, which are connected to the printed circuit board and which are partially arranged within the printed circuit board compartment, are preferably also separated from the steering wires and such other components arranged within the proximal endoscope handle. Thus, tangling/crossing of the cables, wires and tubes can also be prevented.

The separation means may be formed integrally with the housing of the proximal endoscope handle. In other words, the separation means and the housing of the proximal endoscope handle may be formed as one single, integral part e.g. via injection molding. In this way, the separation means may be formed in the manufacturing process of the housing of the proximal endoscope handle. So it is not necessary to assemble the separation means to the housing of the proximal endoscope handle later on.

Alternatively, the separation means may be a separate part/component, which is separate from the housing of the proximal endoscope handle and which is attached to the housing, e.g. by screw connection, heat stacking, adhesive, etc. This may lead to an increased design flexibility. E.g., the separation means may be made of a material different from that of the housing of the endoscope handle. Moreover, it is easier to manufacture the separation means in an injection molding process (in particular with less core mold pieces) when it is provided separate from the housing.

According to one aspect of the present disclosure, the separation means may comprise at least one wall/partition wall provided inside the housing so as to separate the printed circuit board compartment from the steering wire compartment. Said differently, the printed circuit board is preferably arranged in the printed circuit board compartment provided inside the housing and a proximal end of the steering wire is preferably provided/arranged in the steering wire compartment provided inside the housing, and the at least one wall/partition wall is provided inside the housing so as to separate the printed circuit board compartment from the steering wire compartment. The at least one wall/partition wall thus preferably separates an inner space of the housing of the endoscope handle into at least two different compartments accommodating different parts/components respectively.

The at least one wall/partition wall preferably extends along/in a longitudinal direction of the proximal endoscope handle.

The at least one wall/partition wall may be arranged at a central position within the housing of the proximal endoscope handle. Since the housing of the proximal endoscope handle has substantially a hollow cylindrical shape and the at least one wall/partition wall may extend along the longitudinal direction of the proximal endoscope handle, the two compartments may e.g. be formed on two sides of the at least one wall/partition wall to have e.g. a half cylindrical shape respectively. Since the steering wires, tubes and cables preferably extend through the endoscope handle in the same direction, i.e. in a longitudinal direction/proximal-distal direction of the endoscope handle, the steering wires and tubes can be guided into a first compartment, namely the steering wire compartment, and the cables can be guided into a second compartment, namely the printed circuit board compartment.

The at least one wall/partition wall may be formed with a rectangular shape, an oval shape or any other appropriate shape. More preferably, the at least one wall/partition wall may have a shape substantially corresponding to a cross section of the inner space of the housing of the endoscope handle, preferably the cross section along a central axis of the housing, in order to form two separated compartments. With this configuration, the protection of the printed circuit board can be improved.

The at least one wall/partition wall may be formed as a part or portion of the housing. In other words, the at least one wall/partition wall and the housing of the endoscope handle may be formed as one single, integral part e.g. via injection molding. Alternatively, the at least one wall may be formed separately from the housing, and attached to the housing, e.g. by screw connection, heat stacking, adhesive, etc.

Preferably, the at least one wall is made from a rigid polymer material, in particular a thermoplastic polymer material. However, other polymers are basically conceivable.

The printed circuit board may be arranged in parallel with respect to the at least one wall/partition wall. With this configuration, the printed circuit board occupies only a small space in the transverse direction, so that a size of the printed circuit board compartment can be kept as small as possible. Thereby, more space is available for the steering wire compartment, in which not only the steering wire, but also other parts/components may be arranged, and there is no mutual interference.

It is of particular advantage when the separation means comprises two walls/partition walls, wherein a first partition wall of the two partition walls separates the printed circuit board compartment from a first steering wire compartment and a second partition wall of the two partition walls separates the printed circuit board compartment from a second steering wire compartment.

Preferably, the two walls/partition walls extend substantially parallel to each other and substantially along/in the longitudinal direction of the proximal endoscope handle. In other words, the inner space of the housing of the proximal endoscope handle may especially preferred be divided into one printed circuit board compartment and two steering wire compartments on both lateral/peripheral sides of the printed circuit board compartment by said two walls/partition walls. The printed circuit board may thus be protected by two walls/partition walls.

The printed circuit board may be arranged in parallel with respect to the two walls/partition walls. Thus, there is enough inner space left for the steering wire compartments, in particular for the parts/components which shall be received in the steering wire compartments.

Preferably, the printed circuit board is arranged centrally/at a central position inside the proximal endoscope handle.

The two walls/partition walls may be arranged symmetrically with respect to the printed circuit board. In other words, the central printed circuit board may be sandwiched by the two walls/partition walls. In this way, a compact printed circuit board compartment can be obtained, thereby leaving enough space for larger steering wire compartments.

The printed circuit board compartment is preferably provided centrally inside the proximal endoscope handle, and the first steering wire compartment is positioned peripherally/laterally on a first side of the printed circuit board compartment and the second steering wire compartment is positioned peripherally/laterally on a second side of the printed circuit board compartment, wherein the second side is preferably diametrically opposed with respect to the first side. With this configuration, both lateral sides of the printed circuit board compartment can be used to form steering wire compartments. Thus, parts/components, which are different from the printed circuit board and from the cables connected to the printed circuit board and which shall be arranged in the endoscope handle can be arranged in two different compartments on the lateral sides of the printed circuit board compartment.

Positioning the printed circuit board rather centrally, and the steering wires rather peripherally is of particular advantage, since the steering wires usually run along a periphery of the insertion tube. So, crossing of the steering wires and the cables in the endoscope handle is suitably prevented.

It is preferable if a size/area/surface of the at least one partition wall (preferably of the two partition walls) is greater/larger than a size/area/surface of the printed circuit board.

Moreover, it is of particular advantage if a distal end of the at least one partition wall, preferably distal ends of both partition walls, is (are) arranged further distal than a distal end of the printed circuit board.

According to a preferred embodiment, the separation means is formed as a separation component/part configured to be inserted into the housing and the at least one wall/partition wall, preferably the two walls/partition walls, is a portion of the separation component/part.

The separation component/part is preferably a single/integral/monolithic part/component.

The separation component/part is preferably formed such that it defines/limits the printed circuit board compartment and the steering wire compartment(s), in particular by means of the at least one wall/partition wall, preferably by the two walls/partition walls integrally formed on the separation component/part.

The separation component comprising the wall(s) is preferably a part separate from the housing of the endoscope handle.

The at least one wall/partition wall is preferably a portion of the separation component. That means, the separation component does not merely comprise the wall portion(s) serving to separate the inner space of the handle into a plurality of compartments, but may also have other functions, such as guiding and attachment functions of other parts/components etc.

In this respect, the separation component/part may further be designated as a wire-tube-base component or rather as a wire-pipe-base component. That means, the separation component/part can basically be used as a base for wires, such as steering wires or pull wires, and for tubes/pipes, such as fluid tubes. Thus, these wires and tubes can be attached/connected to or hanged on or guided by said wire-tube-base component/part. This design efficiently facilitates the assembly of the proximal endoscope handle and avoids an unintentional assembly error, since internal parts of the handle may be assembled to the separation component, when the separation component is not yet arranged in the housing. Moreover, only one assembled unit has to be mounted inside the housing of the endoscope handle.

The separation component/part is preferably made of a rigid polymer material, in particular a thermoplastic polymer material.

Advantageously, the separation component/part comprises two partition walls and at least one connection wall, preferably two connection walls, the at least one connection wall connecting the two partition walls to form an enclosure defining the printed circuit board compartment. In this way, an enclosed printed circuit board compartment formed by at least three sidewalls, preferably by four sidewalls, can be obtained. Thereby, the protection of the printed circuit board from the steering wires and other components within the endoscope handle is further improved, leading to a higher operational safety.

The separation component/part may further comprise a steering wire guide (a guide for the steering wire(s)).

The steering wire guide may comprise a steering wire guiding hole for guiding the steering wire(s). The steering wire guiding hole may be formed/arranged in the steering wire compartment.

Alternatively or additionally, the steering wire guide may comprise guiding structures, such as a recess or a (gutter-like) guiding wall for guiding the steering wire(s).

With the steering wire guide, the steering wires can be guided to have a desired extension direction and cannot be moved in some undesired direction, in particular towards other parts/components within the endoscope handle. This further enhances the operational safety of the endoscope handle.

Additionally, the endoscope may comprise a plurality of steering wires, in particular two or four steering wires, and the separation component/part may be provided with a plurality of steering wire guiding holes, in particular four steering wire guiding holes. The plurality of steering wires preferably pass through the plurality of steering wire guiding holes and are therefore guided by the steering wire guiding holes. Thus, a movement of the steering wires in the lateral/transverse direction can be limited while a movement in the longitudinal direction is possible.

Preferably, the plurality of steering wire guiding holes are formed by hollow cylindrical portions, respectively, which are directly formed/arranged on the at least one wall/partition wall at a side of the steering wire compartment(s). The axes of the hollow cylindrical portions/the axes of the steering wire guiding holes extend substantially parallel to an extension direction of the at least one wall/partition wall or parallel to a longitudinal direction of the endoscope handle.

Particularly preferred, two steering wire guiding holes/two hollow cylindrical portions are arranged in the first steering wire compartment and two steering wire guiding holes/two hollow cylindrical portions are arranged in the second steering wire compartment. With this design, the steering wires can be most efficiently positioned at their ideal location. An assembly efficiency is advantageously improved and any undesired interference between the different components/parts arranged within the steering wire compartment is avoided. In this way, tangling of the steering wires can also be prevented.

In addition, the separation component/part is preferably provided with a valve attachment portion comprising a valve attachment hole formed/arranged in the steering wire compartment and configured such that a valve can be attached to the separation component/part. This valve attachment hole is preferably formed by a larger hollow cylindrical portion (compared to the hollow cylindrical portions forming the steering wire guiding holes), directly arranged on the at least one wall/partition wall at a side of the steering wire compartment. Particularly preferred, the axis of the valve attachment hole/the axis of said larger hollow cylindrical portion extends substantially parallel to the extension direction of the at least one wall/partition wall or parallel to the longitudinal direction of the endoscope handle. With this design, a valve attachment can be realized by the separation component/part without any additional component(s), leading to improved assembly efficiency More preferably, the valve attachment hole/the larger hollow cylindrical portion comprises (crush) ribs on its inner surface, allowing attachment of the valve by deforming. By means of such elastically deformable ribs, the valve can be easily attached to/released from the separation component/part. No additional fastening means, e.g. screws, are needed. Particularly preferred, said ribs extend along the axis of the valve attachment hole and are arranged in a predetermined interval in the circumferential direction.

The separation component/part is preferably further provided with a fluid tube guiding portion comprising a fluid tube guiding hole/aperture formed/arranged in the steering wire compartment. Thus, a fluid tube can be guided, held and retained by the separation component/part. No additional, separate components are thus needed for guiding the fluid tube.

More preferably, the fluid tube guiding hole/aperture is configured to limit a transverse movement of a fluid tube extending through the endoscope handle, i.e. the axis of the fluid tube guiding hole/aperture extends along the longitudinal direction of the endoscope handle, such that the fluid tube is only allowed to freely move in the longitudinal direction. In this manner, the fluid tube can be prevented from contacting/tangling with other components/parts like the steering wire(s) within the proximal endoscope handle. The fluid tube may be a tube for suction/injection of air or water or other fluids.

Particularly preferred, the fluid tube guiding hole/aperture is formed by the at least one wall/partition wall and a bridge portion extending laterally/peripherally away from the at least one wall/partition wall. In other words, one side of the wall/partition wall and the bridge portion preferably form an enclosure defining the fluid tube guiding hole. In this way, the fluid tube can be more efficiently guided by the separation component/part and interference with other components can be prevented.

Thus, it is particularly advantageous if the separation component/part as a single/integral component/part comprises the at least one partition wall, preferably two partition walls, the steering wire guiding hole, the valve attachment hole and the fluid tube guiding hole. Thereby, the separation component/part as a single component can provide different functions in addition to the separation function and no additional components for realizing these additional functions are necessary in the endoscope handle according to the present disclosure. This configuration increases an assembly efficiency and reduces an assembly time and manufacturing costs. In addition, mounting errors during the assembly can be prevented, since only one separation component/part has to be mounted within the endoscope handle.

Preferably, the separation component/part comprising all the above mentioned parts can be formed by injection molding of a rigid polymer material, in particular a thermoplastic polymer material.

Advantageously, the at least one wall/partition wall, preferably the two walls/partition walls, an axis of the steering wire guiding hole, an axis of the valve attachment hole and an axis of the fluid tube guiding hole are all arranged substantially in parallel and extend substantially in a longitudinal direction of the proximal endoscope handle. In this manner, the different components like the printed circuit board, the steering wires, the fluid tube and the valve can be arranged in parallel to each other. So a compact arrangement of different components within the endoscope handle can be achieved.

Moreover, the present disclosure relates to a system comprising an endoscope as described above and a monitor.

BRIEF DESCRIPTION OF FIGURES

The disclosure is explained in more detail below using preferred embodiments and referring to the accompanying figures.

The figures are schematic in nature and serve only to understand the disclosure. Identical elements are marked with the same reference signs. The features of the different embodiments can be interchanged among each other.

DETAILED DESCRIPTION OF PREFERRED EMBODIMENTS

Figure 1:
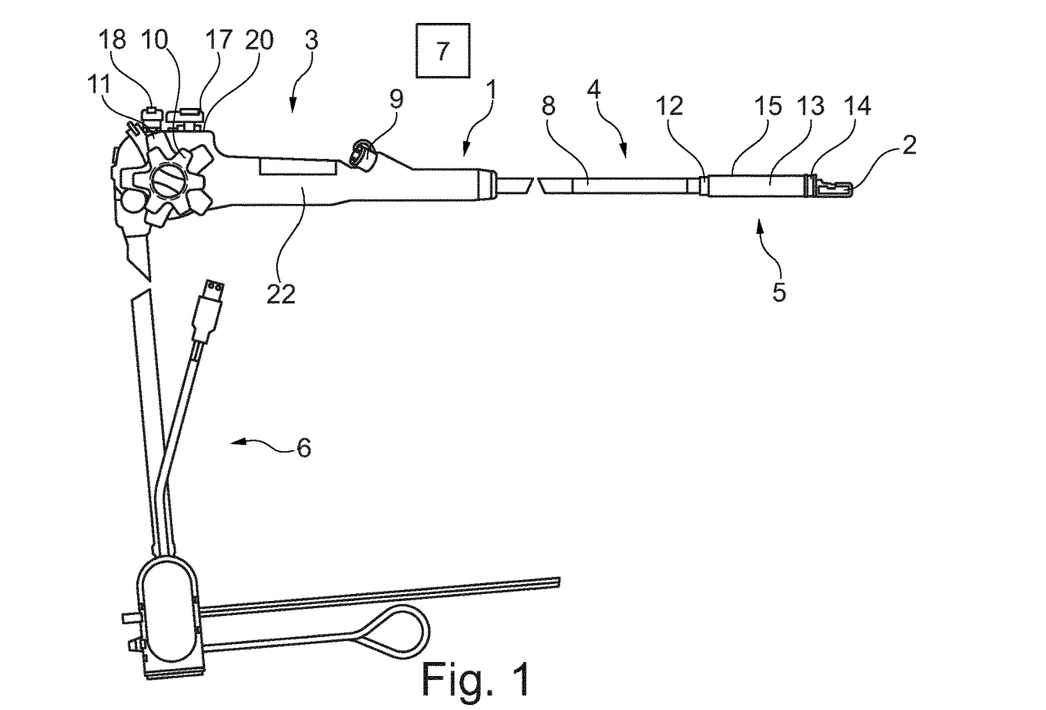
FIG. 1 is a plan view showing an endoscope according to the present disclosure.

In FIG. 1, an endoscope 1 is shown. The endoscope 1 is preferably a single-use endoscope. The endoscope 1 comprises a distal tip unit 2, which is configured to be inserted into a patient's body cavity. Further, the endoscope 1 comprises a proximal endoscope handle 3 designed to be held by a user/physician and being configured to accommodate operating parts of the endoscope 1. Moreover, the endoscope 1 comprises an insertion tube 4 and a bending section 5, the insertion tube 4 and the bending section 5 extending from the endoscope handle 3 to the distal tip unit 2 and thus connecting the endoscope handle 3 and the distal tip unit 2. Said differently, the endoscope 1 comprises an endoscope handle 3 and an insertion cord, wherein the insertion cord comprises the insertion tube 4, the bending section 5 and the distal tip unit 2. Moreover, a connector unit 6 for connecting the endoscope 1 to a supply unit is shown in FIG. 1.

At the distal tip unit 2, image capturing means such as a miniature video camera and illuminating means such as light-emitting diodes or fiber optic light guides connected to a proximal source of light are arranged/installed, such that the patient's body cavity can be illuminated and inspected. An image captured by the image capturing means can be shown on a monitor 7. The monitor 7 is provided separately from and connected with the endoscope 1.

The endoscope 1 has an internal working channel 8, which is formed as a bendable/flexible tube (not shown in FIG. 1). The working channel 8 is provided in/inside the insertion tube 4 and the bending section 5 and extends from the endoscope handle 3 towards the distal tip unit 2. The working channel 8 is accessible via an access port 9. In particular, a surgical instrument may be guided through the working channel 8 into the patient's body cavity via the access port 9. The user/physician is thus able to perform medical operations such as examinations within the patient's body cavity with the surgical instrument.

The endoscope handle 3 comprises two handle wheels, namely a first handle wheel 10 and a second handle wheel 11, for steering the distal tip unit 2. In particular, the first handle wheel 10 and the second handle wheel 11 can both be rotated/turned by the user. The first handle wheel 10 and the second handle wheel 11 are arranged coaxially, i.e. can be rotated around a common rotational axis.

The distal tip unit 2 may be tilted/bent/moved by bending the bending section 5. The endoscope 1 shown in FIG. 1 is basically a two-plane bending endoscope. This means that the distal tip unit 2 may bend in a first bending plane (e.g. in an up-and-down direction) and in a second bending plane (e.g. in a right-and-left direction). In particular, one of the handle wheels 10, 11, e.g. the first handle wheel 10, can be operated by the user to bend the distal tip unit 2 in the first bending plane and the other one of the handle wheels 10, 11, e.g. the second handle wheel 11, can be operated by the user to bend the distal tip unit 2 in the second bending plane. The first bending plane is preferably perpendicular to the second bending plane.

The bending section 5 comprises a plurality of segments including a proximal end segment 12, a plurality of intermediate segments 13 and a distal end segment 14. Two adjacent segments among the plurality of segments, i.e. a pair of segments, may be connected via corresponding flexible hinge members, respectively. The bending section may be largely covered by a flexible cover 15 for preventing contamination.

The endoscope 1 comprises two steering wires 16 for controlling the bending movement of the bending section 5. One steering wire 16 of the two steering wires 16 is connected to the first handle wheel 10 and the other one of the two steering wires 16 is connected to the second handle wheel 11. The steering wires 16 extend through the insertion tube 4 and the bending section 5. Each of the two steering wires 16 forms a loop and is thus fixed/locked in a distal end portion of the bending section 5, in particular in the distal end segment 14, thus each of the steering wires 16 forms two steering wires. The steering wires could alternatively be four individual steering wires which are each fixed at the distal end portion of the bending section 5. By turning the first handle wheel 10, the first steering wire 16 can be pulled and released and the distal tip unit 2 tilts according to a direction in which the first handle wheel 10 is rotated. In other words, by operating the handle wheel 10 the user is able to tilt the distal tip unit 2 in the first bending plane by bending the bending section 5 correspondingly. By turning the second handle wheel 11, the second steering wire 16 can be pulled and released and the distal tip unit 2 tilts according to a direction in which the second handle wheel 11 is rotated. In other words, by operating the handle wheel lithe user is able to tilt the distal tip unit 2 in the second bending plane by bending the bending section 5 correspondingly.

The endoscope 1, in particular the endoscope handle 2, further comprises two valves, namely a gas/water injection valve 17 and a suction valve 18. The gas/water injection valve 17 and the suction valve 18 are arranged side by side on a top surface 20 of a housing 22 of the endoscope handle 3.

Figure 2:
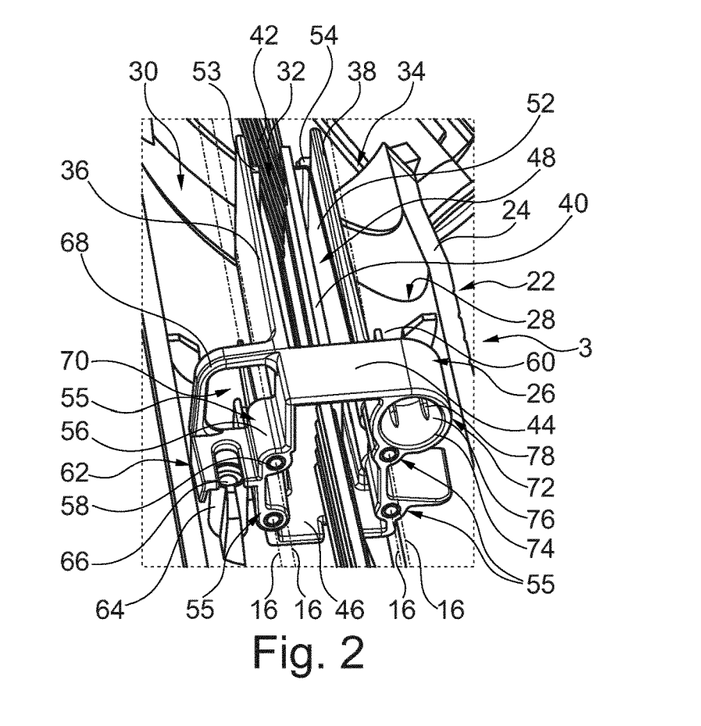
FIG. 2 is a perspective view showing a housing part of an endoscope handle, in which a separation component according to an embodiment of the present disclosure is arranged.

FIG. 2 is a perspective view showing a half shell 24 of the housing 22 of the endoscope handle 3. The half shell 24 together with a further (second) half shell (not shown in FIG. 2) forms the housing 22. The housing 22 thus has a hollow shape. As can be seen in FIG. 2, in the half shell 24 of the housing 22 a separation component 26 is arranged/inserted. The separation component 26 is a part or component separate from the housing 22 and is suitably attached to the housing 22, e.g. by a screw connection. When inserted into the housing 22, the separation component 26 preferably fills/occupies an inner space 28 defined by the housing 22 at least in an area/a portion of the endoscope handle 3 and divides said inner space 28 into three compartments, namely a first steering wire compartment 30, a printed circuit board compartment 32 and a second steering wire compartment 34.

In particular, the separation component 26 comprises two partition walls, namely a first partition wall 36 and a second partition wall 38, and the first partition wall 36 and the second partition wall 38 divide the inner space 28 into the first steering wire compartment 30, the printed circuit board compartment 32 and the second steering wire compartment 34. So the first steering wire compartment 30, the printed circuit board compartment 32 and the second steering wire compartment 34 are separated from each other through the first partition wall 36 and the second partition wall 38.

The first partition wall 36 and the second partition wall 38 are formed as plates. I.e. the first partition wall 36 and the second partition wall 38 are both formed as flat sheet/piece of a rigid/hard material, preferably of the same (rather small) thickness everywhere, limited on two opposite sides by a very extensive flat surface in relation to the thickness. Preferably, the first partition wall 36 and the second partition wall 38 are formed as rectangular plates. It is to be understood however, that the first partition wall 36 and the second partition wall 38 are not limited to having a rectangular shape, but may also have another angular, a round, an oval, etc. shape. As can be seen in FIG. 2, the first partition wall 36 and the second partition wall 38 may have essentially the same size, i.e. the same length, width and thickness.

The first partition wall 36 and the second partition wall 38 extend along or in a longitudinal direction (proximal-distal-direction) of the endoscope handle 3. Moreover, the first partition wall 36 and the second partition wall 38 extend substantially parallel to each other and have a distance between them in a transverse direction.

The printed circuit board compartment 32 is formed/arranged centrally inside the endoscope handle 3 between the first partition wall 36 and the second partition wall 38. A printed circuit board 40 is arranged/accommodated in the printed circuit board compartment 32. The printed circuit board 40 is basically configured to process information received from the image capturing means (optical system) via cables 42 extending from the distal tip unit 2 through the bending section 5 and the insertion tube 4 to the endoscope handle 3. The printed circuit board 40 (like the first partition wall 36 and the second partition wall 38) has a plate-shape and is arranged substantially in parallel with respect to the first partition wall 36 and to the second partition wall 38 (an extension direction of the walls). In particular, the printed circuit board 40 is arranged centrally in the inner space 28 of the housing 22. As shown in FIG. 2 the first partition wall 36 and the second partition wall 38 may be arranged symmetrically with respect to the printed circuit board 40.

An area/surface of the printed circuit board 40, in particular both a length and a width of the printed circuit board 40, is smaller than an area/surface (preferably both a length and a width) of the first partition wall 36 and of the second partition wall 38. So the printed circuit board 40 can be completely covered/protected by the first partition wall 36 and by the second partition wall 38 (when seen from a transverse direction). In particular, there is no overlapping of the printed circuit board 40 with the first partition wall 36/the second partition wall 38 (viewed from the transverse direction). Both a distal end of the first partition wall 36 and a distal end of the second partition wall 38 are arranged further distal than a distal end of the printed circuit board 40. Also both a proximal end of the first partition wall 36 and a proximal end of the second partition wall 38 are arranged further proximal than a proximal end of the printed circuit board 40.

The separation component 26 further comprises two connection walls, namely a first connection wall 44 and a second connection wall 46. The first connection wall 44 and the second connection wall 46 connect the first partition wall 36 and the second partition wall 38, so that an enclosure is formed by the first partition wall 36, the first connection wall 44, the second partition wall 38 and the second connection wall 46. Said enclosure limits/defines the printed circuit board compartment 32 in a transverse direction. The printed circuit board compartment 32 is open/accessible both proximally and distally in the longitudinal direction of the endoscope handle 3, in order to guide cables 42 into and out of the printed circuit board compartment 32.

The first connection wall 44 is rather short in a longitudinal direction (proximal-distal-direction) of the endoscope handle 3 and has a rather bar-like/web-like connecting structure. The first connection wall 44 essentially connects proximal ends of the first partition wall 36 and of the second partition wall 38. The second connection wall 46 is substantially as long as the first partition wall 36 and the second partition wall 38 in the longitudinal direction of the endoscope handle 3. The first connection wall 44 and the second connection wall 46 have an extension direction/are arranged essentially perpendicular with respect to the first partition wall 36 and the second partition wall 44. As the first connection wall 44 is rather short in the longitudinal direction an access opening 48 is formed on a lateral side of the printed circuit board compartment 32, easing both an insertion of the printed circuit board 40 into the printed circuit board compartment 32 and an attachment/fixation of the printed circuit board 40 to the separation component 26. E.g. the printed circuit board 40 may be fixed to the second connection wall 46 by a suitable fixation means like an adhesive, screwing, etc.

Each of the partition walls 36, 38 has a tapered portion on an inner side/on a side of the printed circuit board compartment 32. I.e. the first partition wall 36 has a first tapered portion 50 and the second partition wall 38 has a second tapered portion 52. A distance between the first partition wall 36 and the second partition wall 38 gradually/linearly/continuously decreases form a proximal end of the separation component 26 to a distal end of the separation component 26 in an area where the tapered portions 50, 52 are provided. At distal ends of the tapered portions 50, 52/of the partition walls 36, 38 inwardly protruding protrusions 53, 54 are provided. So the distal opening of the separation component 26 (in the longitudinal direction of the endoscope handle) has a rather small transverse extension (a distance between the protrusions 53, 54 is small in the transverse direction), so that tangling/crossing of the cables 42 running into the printed circuit board compartment 32 can be suitably prevented.

The first steering wire compartment 30 is positioned peripherally or laterally on a first side with respect to the printed circuit board compartment 32. The first steering wire compartment 30 is defined/enclosed by the first partition wall 36 and a portion of the housing 22 of the endoscope handle 3. The second steering wire compartment 34 is positioned peripherally or laterally on a second (other/diametrically opposed) side with respect to the printed circuit board compartment 32. The second steering wire compartment 34 is defined/enclosed by the second partition wall 38 and a portion of the housing 22 of the endoscope handle 3.

The first steering wire compartment 30 comprises two steering wire guide portions 55. The steering wire guide portions 55 are both integrally connected to the first partition wall 36 (at a proximal end of the first partition wall 36), with a distance in a width direction of the first partition wall 36 between the two steering wire guide portions 55. The second steering wire compartment 34 also comprises two steering wire guide portions 55, integrally connected to the second partition wall 38 (at a proximal end of the second partition wall 38), with a distance in a width direction of the second partition wall 38 between those two steering wire guide portions 55. The four steering wire guide portions 55 are essentially arranged at the same longitudinal position and preferably have the same shape/design/formation.

In particular, each of the steering wire guide portions 55 comprises a proximal hollow cylinder 56 having a steering wire guiding hole 58 and a distal gutter-like portion 60. The proximal hollow cylinder 56 and the distal gutter-like portion 60 are directly connected with each other. Each of the steering wire guiding holes 58 and each of the gutter-like portions 60 have a longitudinal extension direction.

An attachment portion 62 extends laterally away from the steering wire guide portions arranged in the first steering wire compartment 30 (i.e. laterally away towards the housing 22/the half shell 24 from an area where the steering wire guide portions 55 are arranged). The attachment portion 62 is configured/formed to accommodate a protrusion 64 integrally connected to the housing 22/half shell 24 and having a hole 66. The attachment portion 62 can be fixed to the housing 22/half shell 24 through a (not shown) screw (e.g. a self-tapping screw), which is screwed in the hole 66. Further attachment portions may be provided if considered relevant, and instead of a screw other suitable means of fixing are conceivable, such as gluing or heat stacking.

Further, the separation component 26 comprises a bridge portion 68 in the first steering wire compartment 30, wherein the bridge portion 68 extends laterally/peripherally away from the first partition wall 36, has a bent/curved/arc portion and connects the first partition wall 36 with the attachment portion 62. The bridge portion 68, together with a portion of the attachment portion 62, a portion of the hollow cylinder 56 of the steering wire guide portion 55 and a portion of the first partition wall 36 forms a fluid tube guiding hole 70 configured to limit a transverse movement of a fluid tube extending through the endoscope handle 3.

In addition, the separation component 26 comprises a valve attachment portion 72 in the second steering wire compartment 34. The valve attachment portion 72 comprises a relatively large hollow cylinder 74 having a valve attachment hole 76. A plurality of (circumferentially equally spaced) crush ribs 78 are provided in/inside the valve attachment hole 76 allowing attachment of a valve by deforming. The valve can be a check valve to avoid backflow for example in a water injection tube.

The separation component 26 according to the present disclosure is a one piece/integral, preferably one material, part made of a (thermoplastic) polymer material and is manufactured using an injection-molding process.

The separation component 26 is a part, which is designed so as to suitably arrange (in a space-saving manner) different parts like the printed circuit board 40, steering wires 16, fluid tubes or valves inside the housing 22 of the endoscope handle 3. The printed circuit board 40 is suitably protected by the separation component 26, so that in particular the steering wires 16, but also other parts like fluid tubes, valves, etc. will not electrically or mechanically damage the printed circuit board 40. As can be seen in FIG. 2 the steering wires 16 are appropriately held/retained by the steering wire guide portions 55, and the first partition wall 36 and the second partition wall 38 provide a suitable barrier, so that the steering wires 16 cannot move around in the endoscope handle 3 and reach the printed circuit board 40. The separation component 26 makes it possible that the different parts arranged in the endoscope handle 3 are essentially arranged in parallel to each other (printed circuit board 40, steering wires 16, fluid tube, valve, etc.), thus providing a space-saving and optimized way of arranging said different parts inside the housing 22 of the endoscope handle 3.

Figure 3:
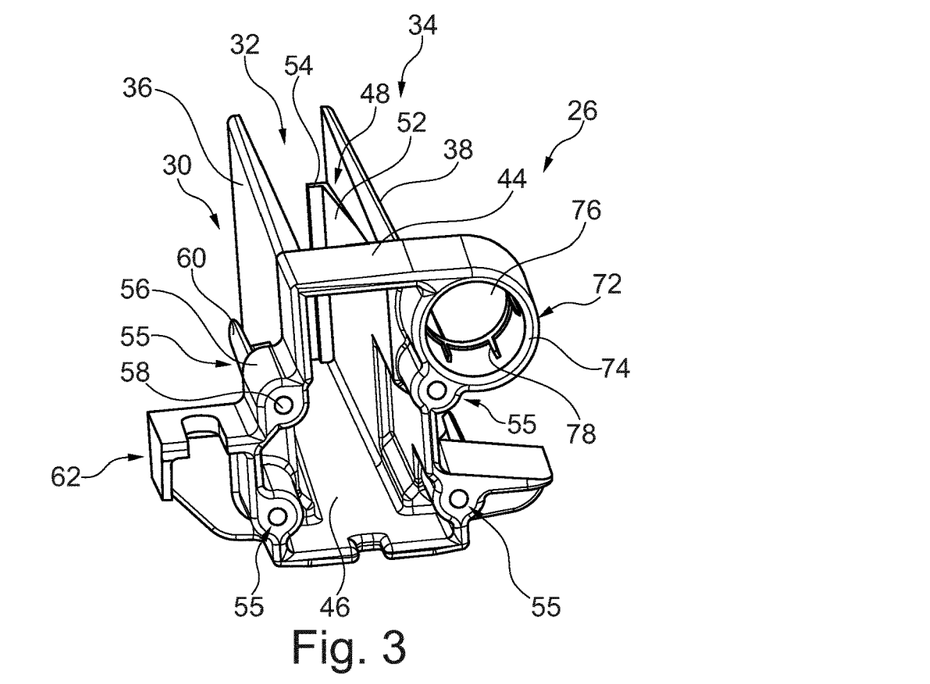
FIG. 3 is a first perspective view of a separation component according to another embodiment of the present disclosure.
Figure 4:
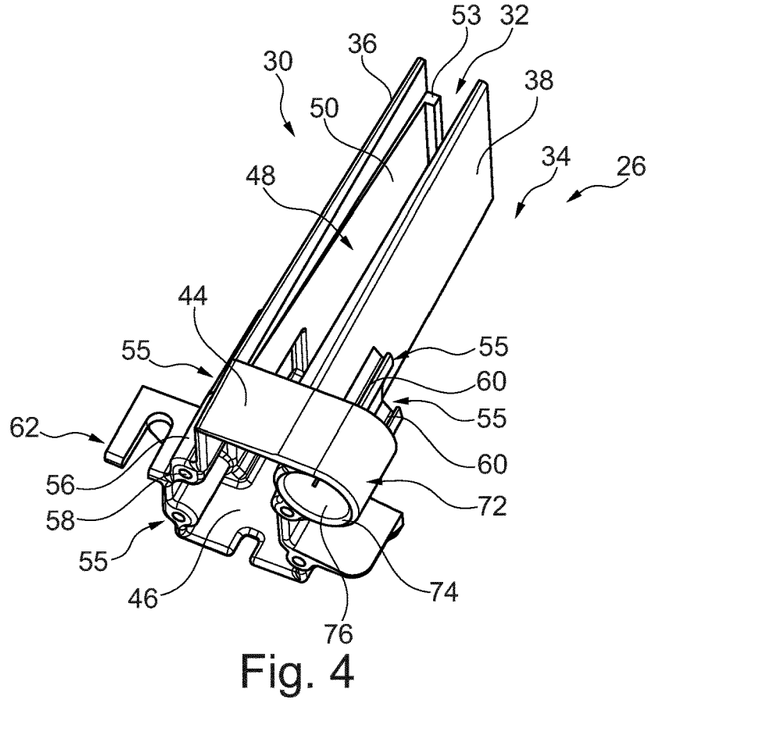
FIG. 4 is a second perspective view of the separation component according to the embodiment of FIG. 3.

FIG. 3 and FIG. 4 are perspective views from which the structure/design of the separation component 26 according to the present disclosure can be better seen. As shown in FIG. 3 and FIG. 4, the separation component 26 does not comprise the bridge portion 68 compared to the separation component 26 shown in FIG. 2. Apart from that the separation component 26 shown in FIG. 3 and FIG. 4 is identical to the separation component 26 shown in FIG. 2 and a description thereof is not repeated. It is to be understood however, that the separation component 26 basically may or may not comprise the bridge portion 68. As mentioned above, the bridge portion 68 is a portion of the fluid tube guiding hole 70 and thus has specific advantages. Therefore, it would be advantageous if the bridge portion 68 was also provided at the separation component 26 shown in FIG. 3 or FIG. 4.

LIST OF REFERENCE SIGNS 1 endoscope
2 distal tip unit
3 endoscope handle
4 insertion tube
5 bending section
6 connector unit
7 monitor
8 working channel
9 access port
10 first handle wheel
11 second handle wheel
12 proximal end segment
13 intermediate segment
14 distal end segment
15 cover
16 steering wire
17 gas/water injection valve
18 suction valve
20 top surface
22 housing (of endoscope handle)
24 half shell
26 separation component
28 inner space
30 first steering wire compartment
32 printed circuit board compartment
34 second steering wire compartment
36 first partition wall
38 second partition wall
40 printed circuit board
42 cable
44 first connection wall
46 second connection wall
48 access opening
50 first tapered portion
52 second tapered portion
53 first protrusion
54 second protrusion
55 steering wire guide portion
56 hollow cylinder
58 steering wire guiding hole
60 gutter-like portion
62 attachment portion
64 protrusion
66 threaded hole
68 bridge portion
70 fluid tube guiding hole
72 valve attachment portion
74 hollow cylinder
76 valve attachment hole
78 crush ribs

The invention claimed is:
1. An endoscope comprising:
a distal tip comprising an optical system;
a handle comprising a housing, a printed circuit board, and steering wheels, the housing defining an inner space enclosing the printed circuit board;
an insertion tube and a bending section, the insertion tube and the bending section connecting the handle and the distal tip;
steering wires connected to the steering wheels and configured to bend the bending section, the steering wires comprising a first steering wire and a second steering wire;
cables connected to the optical system and the printed circuit board to transfer information from the optical system to the printed circuit board, the cables extending from the distal tip through the bending section and the insertion tube to the handle; and a compartment separation component positioned in the inner space of the housing, the compartment separation component comprising:
partition walls including a first partition wall and a second partition wall facing the first partition wall, the partition walls forming a circuit board compartment between the first partition wall and the second partition wall;
connection walls including a first connection wall and a second connection wall, the first connection wall facing the second connection wall, the first connection wall extending between and connecting the first partition wall and the second partition wall, the second connection wall extending between and connecting the first partition wall and the second partition wall; and
steering wire guide portions, the steering wire guide portions extending longitudinally along portions of the partition walls and outside the circuit board compartment, each of the steering wire guide portions comprising a wall extending longitudinally and having a steering wire guide hole therethrough, the steering wire guide hole extending longitudinally between a proximal opening at the proximal end of the steering wire guide portion and a distal opening opposite the proximal opening, the wall enclosing the steering wire guide hole,
wherein the steering wires are positioned outside the circuit board compartment and through the steering wire guide holes.

2. The endoscope of claim 1, wherein the steering wire guide holes comprise two steering wire guide holes adjacent the first partition wall and two steering wire guide holes adjacent the second partition wall.

3. The endoscope of claim 1, wherein the first partition wall has a length and a surface area, the second partition wall has a length and a surface area, the first connection wall has a length, measured parallel to the length of the first partition wall, that is less than the length of the first partition wall and less than the length of the second partition wall.

4. The endoscope of claim 3, wherein the first connection wall and the second connection wall extend between the first partition wall and the second partition wall at a proximal end of the first partition wall and at a proximal end of second partition wall, and wherein the first connection wall is shorter than the second connection wall.

5. The endoscope of claim 1, wherein the printed circuit board has a length, a width, and a surface area, the length of the printed circuit board being smaller than the length of the first partition wall and smaller than the length of the second partition wall, the first partition wall and the second partition wall extending proximally and distally further than the printed circuit board.

6. An endoscope comprising:
a distal tip comprising an optical system;
a handle comprising a housing, a printed circuit board, a compartment separation component, and steering wheels, the housing defining an inner space enclosing the printed circuit board and the compartment separation component, the compartment separation component being a single and integral part comprising partition walls;
an insertion tube and a bending section, the insertion tube and the bending section connecting the handle and the distal tip;
steering wires connected to the steering wheels and configured to bend the bending section, the steering wires comprising a first steering wire and a second steering wire;
cables connected to the optical system and the printed circuit board to transfer information from the optical system to the printed circuit board, the cables extending from the distal tip through the bending section and the insertion tube to the handle,
wherein the compartment separation component forms a circuit board compartment between the partition walls, the partition walls comprising a first partition wall and a second partition wall,
wherein the steering wires are positioned outside the circuit board compartment,
wherein the compartment separation component comprises a first connection wall and a second connection wall extending between the first partition wall and the second partition wall, the first partition wall having a length and a surface area, the second partition wall having a length and a surface area, the first connection wall having a length, measured parallel to the length of the first partition wall, that is less than the length of the first partition wall and less than the length of the second partition wall,
wherein the compartment separation component comprises two steering wire guide holes adjacent the first partition wall and two steering wire guide holes adjacent the second partition wall,
wherein the printed circuit board has a length, a width, and a surface area, the length of the printed circuit board being smaller than the length of the first partition wall and smaller than the length of the second partition wall, the first partition wall and the second partition wall extending proximally and distally further than the printed circuit board, wherein the compartment separation component comprises a valve attachment hole configured to attach a valve, wherein the compartment separation component comprises a fluid tube guiding hole configured to attach a fluid tube, the fluid tube guiding hole positioned opposite the valve attachment hole with the circuit board compartment therebetween.

7. The endoscope of claim 6, wherein the valve attachment hole comprises ribs allowing attachment of the valve by deforming.

8. The endoscope of claim 6, wherein axis of the steering wire guiding holes, an axis of the valve attachment hole and an axis of the fluid tube guiding hole are parallel and extend substantially in a longitudinal direction of the handle.

9. The endoscope of claim 1, wherein each of the steering wire guide portions comprises a steering wire guide slot extending distally from a respective steering wire guide hole.

10. The endoscope of claim 1, wherein the compartment separation component forms a first steering wire compartment and a second steering wire compartment, the first steering wire extending through the first steering wire compartment and the second steering wire extending through the second steering wire compartment.

11. The endoscope of claim 10, wherein the first steering wire compartment is positioned peripherally or laterally on a first side with respect to the printed circuit board compartment and the second steering wire compartment is positioned peripherally or laterally on a second side with respect to the printed circuit board compartment.

12. The endoscope of claim 10, wherein the compartment separation component forms or defines or limits the printed circuit board compartment and the first steering wire compartment or the second steering wire compartment.

13. The endoscope of claim 10, wherein the first partition wall extends between the circuit board compartment and the first steering wire compartment, and the second partition wall extends between the circuit board compartment and the second steering wire compartment.

14. An endoscope comprising:
a distal tip comprising an optical system;
a handle comprising a housing, a printed circuit board, a compartment separation component, and steering wheels, the housing defining an inner space enclosing the printed circuit board and the compartment separation component, the compartment separation component being a single and integral part comprising partition walls;
an insertion tube and a bending section, the insertion tube and the bending section connecting the handle and the distal tip;
steering wires connected to the steering wheels and configured to bend the bending section, the steering wires comprising a first steering wire and a second steering wire;
cables connected to the optical system and the printed circuit board to transfer information from the optical system to the printed circuit board, the cables extending from the distal tip through the bending section and the insertion tube to the handle,
wherein the compartment separation component forms a circuit board compartment between the partition walls, the partition walls comprising a first partition wall and a second partition wall,
wherein the steering wires are positioned outside the circuit board compartment,
wherein the first partition wall has a length and a surface area, wherein the second partition wall has a length and a surface area, wherein the compartment separation component comprises a proximal end, the proximal end comprising:
a first connection wall extending between the first partition wall and the second partition wall, the first connection wall having a length and a surface area, the length, measured parallel to the length of the first partition wall, being less than the length of the first partition wall;
a second connection wall extending between the first partition wall and the second partition wall;
two steering wire guide holes adjacent the first partition wall,
two steering wire guide holes adjacent the second partition wall,
a valve attachment hole configured to attach a valve, and
a fluid tube guiding hole configured to attach a fluid tube, the fluid tube guiding hole positioned opposite the valve attachment hole with the circuit board compartment therebetween.

15. The endoscope of claim 14, wherein the second connection wall is coextensive with the first partition wall.

16. The endoscope of claim 14, wherein the first partition wall has a tapering portion along at least a portion of its length, wherein the second partition wall has a tapering portion along at least a portion of its length, and wherein a distance between the tapering portion of the first partition wall and the tapering portion of the second partition wall decreases distally.

17. The endoscope of claim 14, wherein axis of the steering wire guiding holes, an axis of the valve attachment hole and an axis of the fluid tube guiding hole are parallel and extend substantially in a longitudinal direction of the handle.

18. A system comprising:
the endoscope of claim 1; and
a monitor.

19. The endoscope of claim 1, wherein the compartment separation component comprises a valve and a valve attachment hole configured to attach the valve.

20. The endoscope of claim 19, wherein the compartment separation component comprises a fluid tube guiding hole configured to attach a fluid tube, the fluid tube guiding hole positioned opposite the valve attachment hole with the circuit board compartment therebetween.

* * * * *